United States Patent [19]
Matsuda et al.

[11] Patent Number: 5,737,513
[45] Date of Patent: Apr. 7, 1998

[54] METHOD OF AND SYSTEM FOR VERIFYING OPERATION CONCURRENCE IN MAINTENANCE/REPLACEMENT OF TWIN CPUS

[75] Inventors: Koji Matsuda, Hitachinaka; Yoshihiro Miyazaki, Hitachi; Soichi Takaya, Hitachi; Kazuhiro Hyuga, Hitachi; Nobuo Akeura, Ebina; Shinichiro Yamaguchi, Mito; Naoto Miyazaki, Hitachi; Satoru Kayukawa, Hitachinaka, all of Japan

[73] Assignees: Hitachi, Ltd., Tokyo; Hitachi Information & Control Systems Inc., Hitachi, both of Japan

[21] Appl. No.: 650,662

[22] Filed: May 20, 1996

[30] Foreign Application Priority Data

May 24, 1995 [JP] Japan .................. 7-125109

[51] Int. Cl.[6] .............................. G06F 11/16; G06F 11/22
[52] U.S. Cl. .................. 395/182.09; 395/182.1
[58] Field of Search ............... 395/182.08, 182.09, 395/182.1, 184.01, 182.04, 182.13, 182.03, 185.02, 185.01, 182.11, 182.19, 183.13, 185.03; 371/47.1

[56] References Cited

U.S. PATENT DOCUMENTS

| | | |
|---|---|---|
| 3,810,119 | 5/1974 | Zieve et al. .................. 395/182.1 |
| 3,864,670 | 2/1975 | Inoue et al. .................. 340/172.5 |
| 4,012,717 | 3/1977 | Censier et al. ................ 395/182.1 |
| 4,049,957 | 9/1977 | Kera et al. .................... 235/153 |
| 4,358,823 | 11/1982 | McDonald et al. ............ 395/182.09 |
| 4,366,535 | 12/1982 | Cedolin et al. ................ 364/200 |
| 4,851,985 | 7/1989 | Burror et al. ................. 395/184.01 |
| 4,965,717 | 10/1990 | Cutts, Jr. et al. .............. 395/185.01 |
| 5,005,174 | 4/1991 | Bruckert et al. .............. 395/182.09 |
| 5,029,071 | 7/1991 | Kinoshita .................... 395/182.09 |
| 5,086,499 | 2/1992 | Mutone ...................... 395/182.08 |
| 5,138,708 | 8/1992 | Vosbury ..................... 395/182.09 |
| 5,430,866 | 7/1995 | Lawrence et al. ............. 395/185.02 |
| 5,434,998 | 7/1995 | Akai et al. ................... 395/575 |
| 5,452,443 | 9/1995 | Oyamada et al. ............. 395/182.08 |

*Primary Examiner*—Robert W. Beausoliel, Jr.
*Assistant Examiner*—Scott T. Baderman
*Attorney, Agent, or Firm*—Kenyon & Kenyon

[57] ABSTRACT

A method of verifying operation concurrence in maintenance/replacement of twin CPUs employed in a dual-CPU computer wherein a replacement CPU with an initial fault may have been installed by mistake during on-line maintenance/replacement work and a system therefor are disclosed whereby a failure which, without the method and the system, would occur due to the initial fault of the replacement CPU during a dual subsystem synchronous operation carried out thereafter by the computer can be prevented from entailing a system down on both the subsystems.

9 Claims, 8 Drawing Sheets

310A, 310B: SYSTEM BUS
320A, 320B: SINGLE-SUBSYSTEM STATE SIGNAL
330A, 330B: OPERATION-CONCURRENCE VERIFYING STATE SIGNAL
370A, 370B: I/O BUS
380A, 380B: INTER-CPU INTERFACE SIGNAL
390A, 390B: OPERATION COMPARISON RESULT SIGNAL

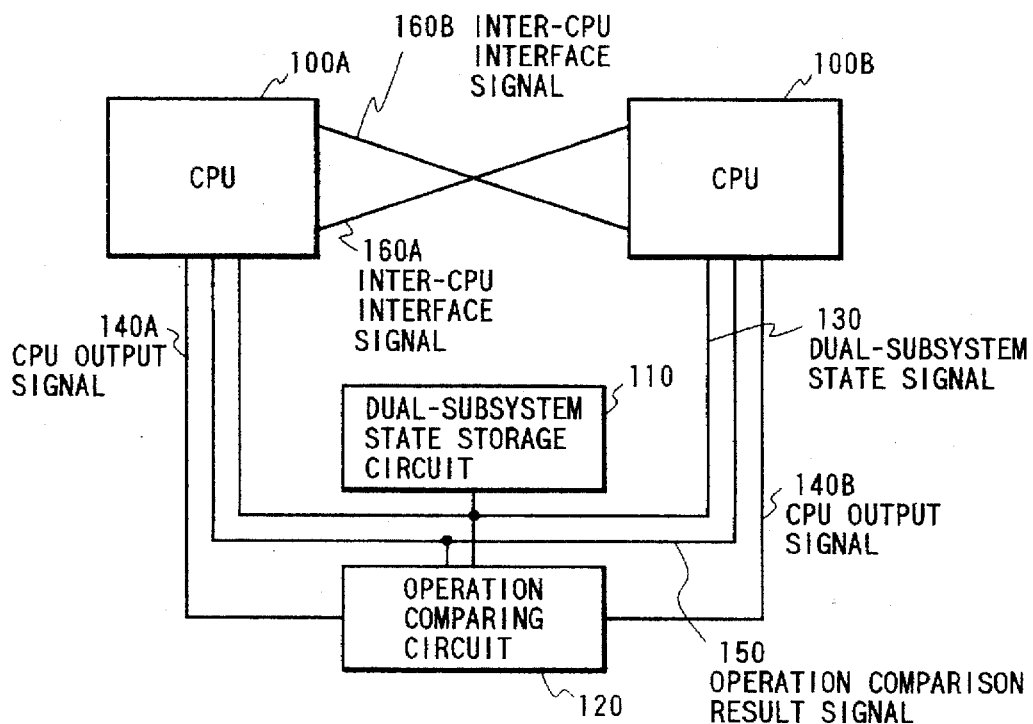

310A, 310B: SYSTEM BUS
320A, 320B: SINGLE-SUBSYSTEM STATE SIGNAL
330A, 330B: OPERATION-CONCURRENCE VERIFYING STATE SIGNAL
370A, 370B: I/O BUS
380A, 380B: INTER-CPU INTERFACE SIGNAL
390A, 390B: OPERATION COMPARISON RESULT SIGNAL

FIG. 5

DEFINITION OF FOUR-BIT PATTERNS STORED IN THE SINGLE-SUBSYSTEM STATE STORAGE CIRCUIT 300 (4BIT)

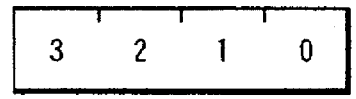

| BIT 3210 | SINGLE-SUBSYSTEM STATE |
|---|---|
| 0001 | STATE OF OPERATING IN THE SYSTEM |
| 0010 | STATE OF BEING CUT OFF FROM THE SYSTEM |
| 0100 | STATE OF OPERATION-CONCURRENCE VERIFICATION |

THE OTHER BIT PATTERNS ARE NOT USED

FIG. 6

DEFINITION OF TWO-BIT PATTERNS STORED IN THE DUAL-SUBSYSTEM STATE STORAGE CIRCUIT 110 (2BIT)

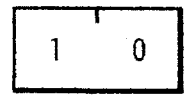

| BIT 10 | DUAL-SUBSYSTEM STATE |
|---|---|
| 00 | STATE WITH BOTH THE SUBSYSTEMS CARRYING OUT DIFFERENT OPERATIONS |
| 01 | STATE OF VERIFYING CONCURRENCE OF OPERATIONS FOR THE A SUBSYSTEM |
| 10 | STATE OF VERIFYING CONCURRENCE OF OPERATIONS FOR THE B SUBSYSTEM |
| 11 | STATE WITH BOTH THE SUBSYSTEMS CARRYING OUT THE SAME OPERATION |

FIG. 7

| CPU (100A) | CPU (100B) | DUAL-SUBSYSTEM OPERATING STATE | OUTPUT SELECTING CIRCUIT | | OPERATION COMPARING CIRCUIT | |
|---|---|---|---|---|---|---|
| | | | 340A | 340B | 120A | 120B |
| STATE OF BEING CUT OFF FROM THE SYSTEM | STATE OF BEING CUT OFF FROM THE SYSTEM | STATE WITH BOTH THE SUBSYSTEMS CARRYING OUT DIFFERENT OPERATIONS | 310A | 310B | NOP | NOP |
| STATE OF BEING CUT OFF FROM THE SYSTEM | STATE OF OPERATING IN THE SYSTEM | STATE WITH BOTH THE SUBSYSTEMS CARRYING OUT DIFFERENT OPERATIONS | 310B | 310B | NOP | NOP |
| STATE OF OPERATION-CONCURRENCE VERIFICATION | STATE OF OPERATING IN THE SYSTEM | STATE OF VERIFYING CONCURRENCE OF OPERATIONS FOR THE A SUBSYSTEM | 310B | 310B | COMPARE | NOP |
| STATE OF OPERATING IN THE SYSTEM | STATE OF BEING CUT OFF FROM THE SYSTEM | STATE WITH BOTH THE SUBSYSTEMS CARRYING OUT DIFFERENT OPERATIONS | 310A | 310A | NOP | NOP |
| STATE OF OPERATING IN THE SYSTEM | STATE OF OPERATION-CONCURRENCE VERIFICATION | STATE OF VERIFYING CONCURRENCE OF OPERATIONS FOR THE B SUBSYSTEM | 310A | 310A | NOP | COMPARE |
| STATE OF OPERATING IN THE SYSTEM | STATE OF OPERATING IN THE SYSTEM | STATE WITH BOTH THE SUBSYSTEMS CARRYING OUT THE SAME OPERATION | 310A | 310B | NOP | NOP |

NOP: NO OPERATION

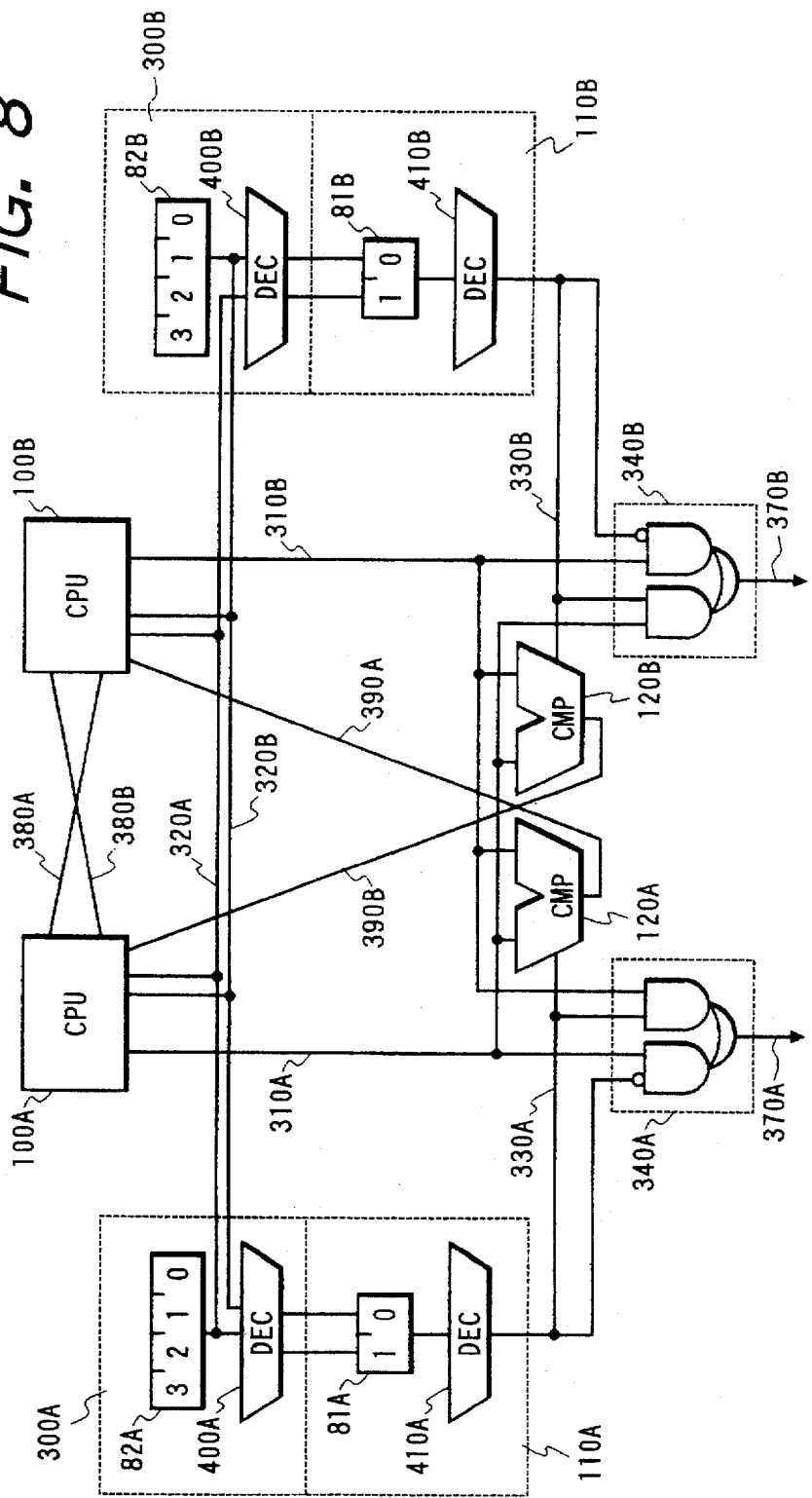

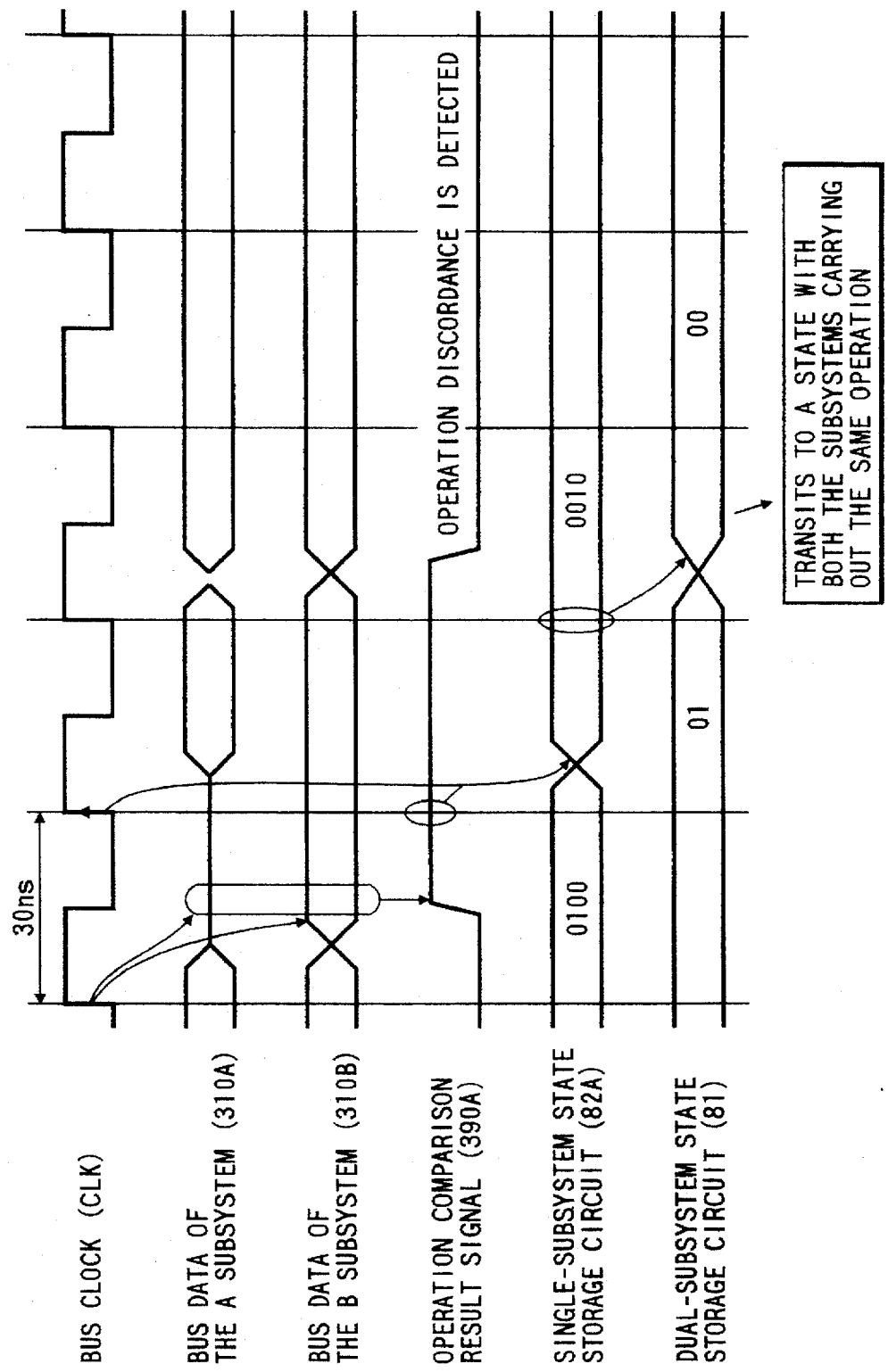

METHOD OF AND SYSTEM FOR VERIFYING OPERATION CONCURRENCE IN MAINTENANCE/REPLACEMENT OF TWIN CPUS

BACKGROUND OF THE INVENTION

The present invention relates to a dual-CPU computer system comprising twin CPUs. In particular, the present invention relates to a method of verifying operation concurrence in maintenance/replacement of twin CPUs employed in a dual-CPU computer and a system therefor whereby, with a CPU in one of the subsystems operating (that is, one of the subsystem CPUs operating), the CPU in the other subsystem (that is, the other subsystem CPU) can undergo preventive maintenance or be replaced.

In recent years, the demand for the 24-hour non-stop use of an information communication system is rising, making the use of a dual-CPU computer system having a high reliability more popular. Main technologies of a dual-CPU computer system include redundancy of hardware, failure detection and separation of a faulty subsystem.

A technique for detecting a failure occurring in a multiprocessor system is disclosed in Japanese Patent Laid-open No. Hei 2-281368, whereby a faulty processor notifies another processor of the occurrence of a failure even though the faulty processor itself can not issue a message indicating the occurrence of the fault. In addition, another failure detecting method is disclosed in Japanese Patent Laid-open No. Hei 4-32955, whereby an out-of-synchronization state can not be detected as a failure due to characteristics of the multiprocessor system. With this method, only the occurrence of a real failure can be detected.

In the conventional technologies described above, a failure occurring in redundant hardware is detected, aiming at a main objective to quickly protect other pieces of hardware against effects of faulty hardware in the event of a failure.

In general, however, a failure identified in the maintenance/replacement of hardware is most likely caused by a hardware initial fault. There is possibility of such a hardware initial fault's being left undetected even after carrying out a self diagnosis. In addition, in spite of the fact that, before letting both subsystems perform the same operation, normally, data coincidence of both the subsystems is examined, there is no guarantee that the data coincidence is verified before both the subsystems perform the same operation.

In such a case, a failure occurring in a subsystem in a process of maintenance/replacement may have a bad effect on the system. As a concrete example, consider a dual-CPU computer system including a CPU with an initial fault which CPU has been installed by mistake therein during on-line maintenance/replacement work. A failure occurring in a dual-subsystem synchronous operation carried out thereafter by the system which failure is caused by the initial fault of the CPU included in the system may entail a system down on not only the subsystem in the process of the maintenance/replacement but also on the both subsystems including the subsystem in operation. In spite of the existence of this problem, no effective measures are taken so far. A solution to the problem is thus required.

SUMMARY OF THE INVENTION

It is an object of the present invention to provide a method of verifying operation concurrence in maintenance/replacement of twin CPUs employed in a dual-CPU computer and a system therefor wherein one of the CPUs with an initial fault may have been installed by mistake during the on-line maintenance/replacement work, which method and system can prevent a failure caused by the initial fault of the CPU to occur during a dual-subsystem synchronous operation carried out thereafter by the computer from entailing a system down on both subsystems.

In order to achieve the object described above, the present invention provides a method of verifying operation concurrence and a system therefor wherein:

a dual-subsystem state storage unit is provided for storing at least a state with both the subsystems carrying out the same operation, a state with both the subsystems carrying out different operations and a state of verifying concurrence of operations carried out by both the subsystems;

an operation comparing unit is connected to the dual-subsystem state storage unit and the twin CPUs and used for comparing operations carried out by the twin CPUs with each other when a state of verifying concurrence of operations carried out by both the subsystems is stored in the dual-subsystem state storage unit;

both the subsystems are started to carry out the same operation after installation of a replacement CPU;

a state of verifying concurrence of operations carried out by both the subsystems is stored in the dual-subsystem state storage unit to replace a state with both the subsystems carrying out different operations in order to let the operation comparing unit start to compare operations carried out by the twin CPUs with each other; and a state with both the subsystems carrying out the same operation is stored in the dual-subsystem state storage unit if a result of the comparison carried out by the operation comparing unit indicates that the operations carried out by the twin CPUs coincide with each other, or else a state with both the subsystems carrying out different operations is stored in the dual-subsystem state storage unit if the result of the comparison carried out by the operation comparing unit indicates that the operations carried out by the twin CPUs do not coincide with each other.

In a dual-CPU computer system wherein, while a CPU in one of the subsystems is operating, the CPU in the other subsystem can undergo preventive maintenance or be replaced, a dual-subsystem state storage unit is provided for storing at least a state with both the subsystems carrying out the same operation, a state with both the subsystems carrying out different operations, a state of verifying concurrence of operations carried out by both the subsystems which states each indicate the state of the CPU. An operation comparing unit connected to the dual-subsystem state storage unit and the twin CPUs is used for comparing operations carried out by the twin CPUs with each other when a state of verifying concurrence operations carried out by both the subsystems is stored in the dual-subsystem state storage unit.

Then, both the subsystems are started to carry out the same operation after installation of a replacement CPU and, at the same time, a state of verifying concurrence of operations carried out by both the subsystems is stored in the dual-subsystem state storage unit to replace a state with both the subsystems carrying out different operations in order to let the operation comparing unit start to compare operations carried out by the twin CPUs with each other. A state with both the subsystems carrying out the same operation is stored in the dual-subsystem state storage unit if a result of the comparison carried out by the operation comparing unit indicates that the operations carried out by the twin CPUs coincide with each other, or else a state with both the subsystems carrying out different operations is stored in the dual-subsystem state storage unit if the result of the comparison carried out by the operation comparing unit indicates that the operations carried out by the twin CPUs do not coincide with each other.

In this way, verification of operation concurrence in maintenance/replacement of twin CPUs can be implemented. In addition, at that time, the state stored in the dual-subsystem state storage unit is monitored. If a transition from a state with both the subsystems carrying out the same operation to a state with both the subsystems carrying out different operations is detected, a proper measure is taken. Normally, by removing the replacement CPU from the dual-CPU computer system wherein the replacement CPU with an initial fault may have been installed by mistake during on-line maintenance/replacement work, a failure which would otherwise occur due to the initial fault of the replacement CPU during a dual subsystem synchronous operation carried out thereafter by the computer can be prevented from entailing a system down on both the subsystems.

BRIEF DESCRIPTION OF THE DRAWINGS

FIG. 1 is a block diagram depicting an outline of a dual-CPU computer system as implemented by a preferred embodiment in accordance with the present invention;

FIG. 2 is a diagram showing a typical definition of bit patterns stored in a dual-subsystem system state storage circuit shown in FIG. 1;

FIG. 5 is a diagram showing a typical definition of bit patterns stored in a single-subsystem state storage circuit shown in FIG. 4;

FIG. 6 is a diagram showing a typical definition of bit patterns stored in a dual-subsystem state storage circuit shown in FIG. 4;

FIG. 7 is a diagram showing relations between the operating state of two subsystems, which is determined by the combination of the operating states of the CPUs in the individual subsystems, and the operating states of output selecting circuits and operation comparing circuits shown in FIG. 4;

FIG. 8 is a diagram showing examples of actual circuit configurations of main components composing the dual-CPU computer system shown in FIG. 4;

FIG. 10 is timecharts in detection of operation discordance carried out in the circuit shown in FIG. 8.

DETAILED DESCRIPTION OF THE PREFERRED EMBODIMENTS

Figure 3:
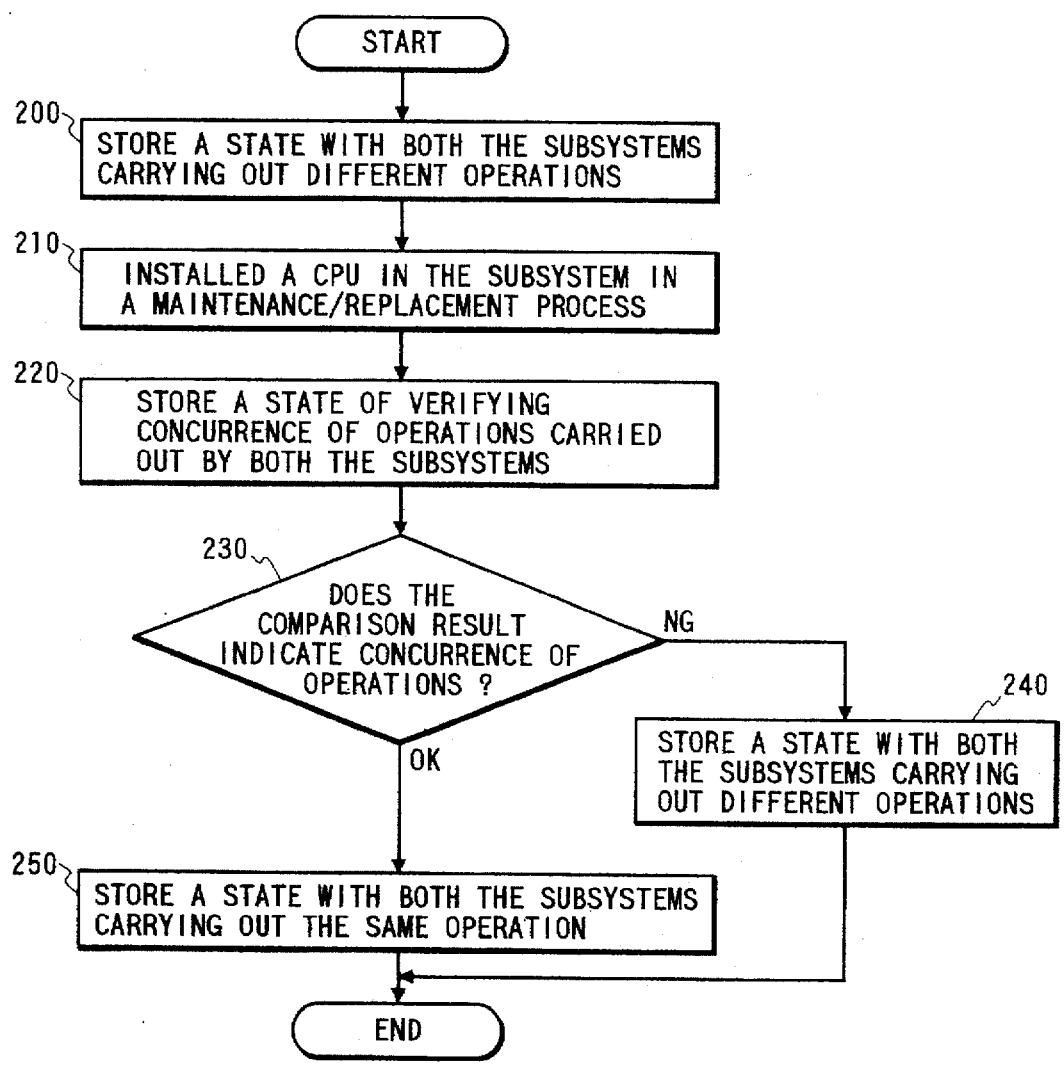
FIG. 3 is a flowchart showing a typical procedure for carrying out maintenance/replacement work on one of CPUs employed in a dual-CPU computer system shown in FIG. 1.

The present invention will become apparent from the following detailed description of preferred embodiments with reference to accompanying diagrams.

FIG. 1 is a block diagram depicting an outline of a dual-CPU computer as implemented by a preferred embodiment of a method of verifying operation concurrence in maintenance/replacement of twin CPUs and a system therefor in accordance with the present invention.

A dual-CPU computer system shown in the figure comprises two CPUs or twin CPUs 100A and 100B for two subsystems respectively. The present invention provides a method of verifying operation concurrence and a system therefor which includes a dual-subsystem state storage circuit 110 for storing the states of the CPUs 100A and 100B of the two subsystems and an operation comparing circuit 120 for comparing the outputs of the CPUs 100A and 100B with each other.

The subsystem CPUs 100A and 100B are connected to each other by transmission lines for exchanging interface signals 160A and 160B between the CPUs 100A and 100B, that is, between the two subsystems. The interface signals 160A and 160B allow the subsystem CPUs 100A and 100B to know the state of each other. In addition, both the subsystem CPUs 100A and 100B can output a reset signal to each other so as to start the same operation in synchronization with a clock signal.

In addition, being connected to the subsystem CPUs 100A and 100B besides the operation comparing circuit 120 by a transmission line for conveying a dual-subsystem state signal 130, the dual-subsystem state storage circuit 110 is used for storing a state with both the subsystems carrying out the same operation, a state with both the subsystems carrying out different operations or a state of verifying concurrence of operations carried out by both the subsystems. The operation comparing circuit 120 is connected to the subsystem CPUs 100A and 100B by transmission lines for conveying CPU output signals 140A and 140B in addition to an operation comparison result signal 150. When a state of verifying concurrence of operations carried out by both the subsystems is stored in the dual-subsystem state storage circuit 110, the operation comparing circuit 120 compares the CPU output signals 140A and 140B with each other.

FIG. 2 is a diagram showing a typical definition of bit patterns stored in the dual-subsystem state storage circuit 110. The dual-subsystem state storage circuit 110 includes a two-bit register for storing a bit pattern defining the operating state of the two subsystems. As shown in the figure, a state with both the subsystems carrying out the same operation, a state with both the subsystems carrying out different operations and a state of verifying concurrence of operations carried out by both the subsystems are represented by the bit patterns 11, 00 and 01 respectively. It should be noted that the bit pattern 10 is not defined.

FIG. 3 is a flowchart showing a typical procedure for carrying out maintenance/replacement work on one of subsystem CPUs employed in the dual-CPU computer system shown in FIG. 1 with the other subsystem CPU operating. A method of verifying operation concurrence in maintenance/replacement of one of the subsystem CPUs and a system therefor provided by the present invention are explained by referring to FIGS. 1 to 3 as follows. Here, let the CPU 100B be operating in the active subsystem whereas the CPU 100A be replaced in the subsystem in a process of maintenance/replacement. Initially, the CPU 100A is not installed yet. Knowing that the CPU 100A is not installed yet from the interface signal 160A, the CPU 100B sets the bit pattern 00 in the two-bit register employed in dual-subsystem state storage circuit 110 at a step 200.

The flow then continues a step 210 at which the replacement CPU 100A is installed. Knowing that the CPU 100A has been installed from the interface signal 160A, the CPU 100B sends a reset signal to its own subsystem and the other subsystem through the interface signal 160B in order to put both the subsystems in a state of carrying out the same operation. After the reset signal is turned off, the CPUs 100A and 100B enter a state with both the subsystems carrying out the same operation wherein the same program is executed thereby in synchronization with a clock signal.

Later on, at a step 220, the CPU 100B changes the contents of the two-bit register employed in the dual-subsystem system state storage circuit 110 from the bit pattern 00 to 01 through the dual-subsystem state signal 130 in order to enter a state of verifying concurrence of operations carried out by both the subsystems. Knowing through the dual-subsystem state signal 130 that the system has entered a state of verifying concurrence of operations carried out by both the subsystems, the operation comparing circuit 120 compares the signals 140A output by the replacement CPU 100A of the subsystem in a process of maintenance/replacement with the signals 140B output by the operative CPU 100B of the active subsystem at a step 230.

If results of the comparison of operations carried out at every clock cycle indicate that any data or control signal of the signals 140A output by the replacement CPU 100A does not match or is not synchronous with the corresponding data or control signal of the signals 140B output by the replacement CPU 100B, the flow continues to a step 240 at which the operation comparison result signal 150 is turned on to indicate that the operation of the CPU 100B does not accord with the operation of the CPU 100A. At this step, knowing the state of discordance, the CPU 100B changes the contents of the two-bit register employed in dual-subsystem state storage circuit 110 from the bit pattern 01 to 00 through the dual-subsystem state signal 130. As a result, the replacement CPU 100A of the subsystem in a process of maintenance/replacement which CPU exhibits an incorrect operation is cut off from the system.

In this way, by removing the replacement CPU 100A from the dual-CPU computer system wherein the replacement CPU 100A with an initial fault has been installed by mistake during on-line maintenance/replacement work, a failure which would otherwise occur due to the initial fault of the replacement CPU 100A during a dual subsystem synchronous operation carried out thereafter by the computer can be prevented from entailing a system down on both the subsystems. If the results of the comparison of operations carried out at every clock cycle indicate that all data and control signals of the signals 140A output by the replacement CPU 100A match or are synchronous with the corresponding data and control signals of the signals 140B output by the replacement CPU 100B, on the other hand, the flow continues to a step 250 at which the operation comparison result signal 150 is turned off to indicate that the operation of the CPU 100B accords with the operation of the CPU 100A. At this step, knowing the state of coincident concurrence, the CPU 100B changes the contents of the two-bit register employed in dual-subsystem state storage circuit 110 from the bit pattern 01 to 11 through the dual-subsystem state signal 130. At this step, the work to install the replacement CPU 100A in the subsystem in a process of maintenance/replacement is completed.

Next, an embodiment provided by the present invention is explained by referring to FIGS. 4 to 10. It should be noted that the same reference numerals shown throughout the figures are used to denote identical or equivalent components.

Figure 4:
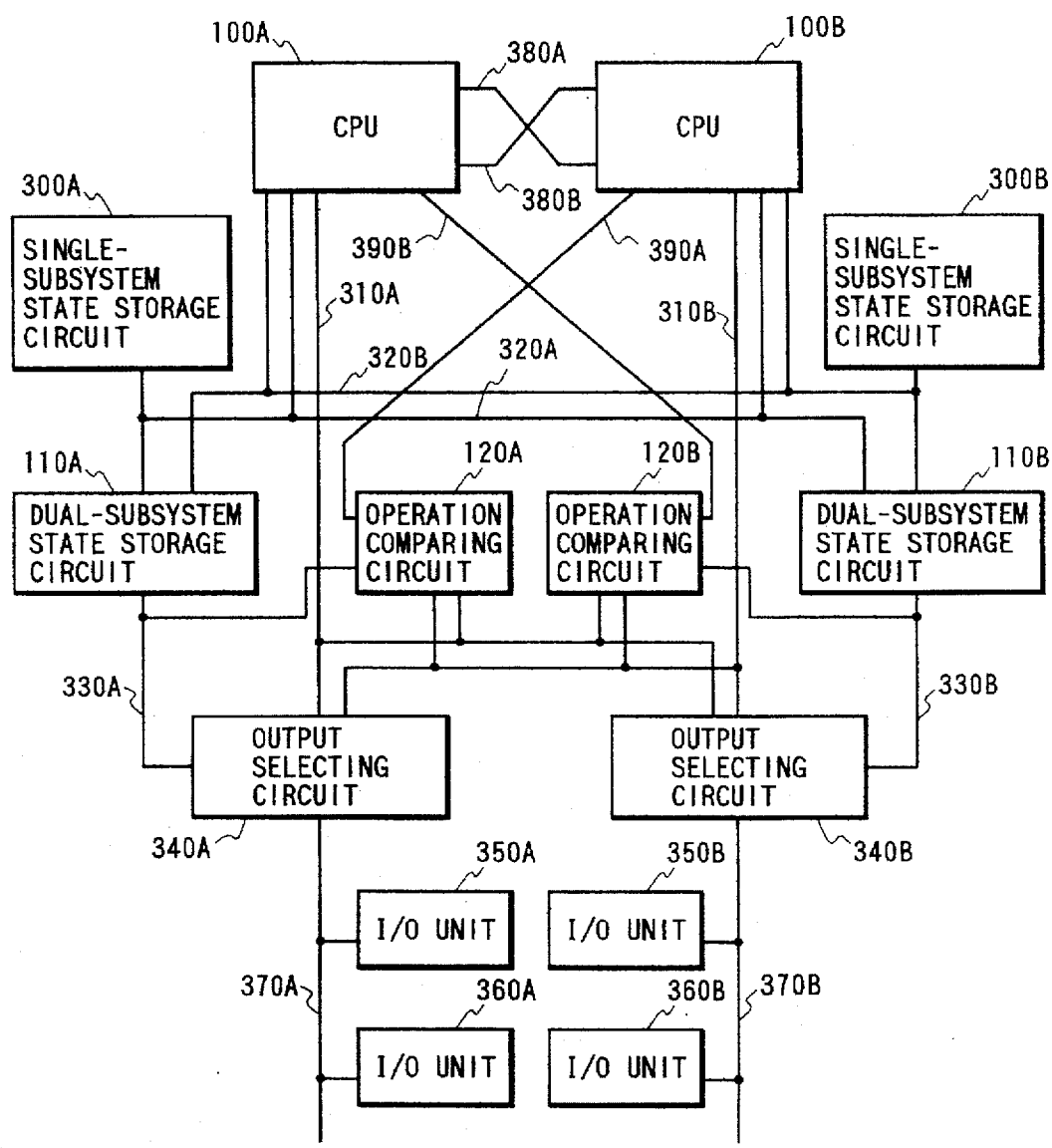
FIG. 4 is a block diagram showing a dual-CPU computer to which the method and system provided by the present invention are applied.

FIG. 4 is a block diagram showing a typical dual-CPU computer to which the method provided by the present invention of verifying operation concurrence in maintenance/replacement of twin CPUs employed in the dual-CPU computer and a system therefor are applied.

The dual-CPU computer system shown in the figure comprises two CPUs or twin CPUs 100A and 100B for two subsystems respectively. The present invention provides a method of verifying operation concurrence and a system therefor which includes single-subsystem state storage circuits 300A and 300B for storing the operating states of the CPUs 100A and 100B respectively, dual-subsystem state storage circuits 110A and 110B for storing the states of the two subsystems, system buses 310A and 310B serving as the output buses of the CPUs 100A and 100B respectively, operation comparing circuits 120A and 120B for comparing the outputs of the CPUs 100A and 100B with each other, output selecting circuits 340A and 340B for selecting outputs of the CPUs 100A and 100B respectively and outputting the selected outputs respectively to I/O buses 370A and 370B to be described later, I/O units 350A, 350B, 360A and 360B and the I/O buses 370A and 370B.

Being connected to each other by transmission lines for conveying inter-CPU interface signals 380A and 380B, the subsystem CPU 100A knows that the subsystem CPU 100B is installed and vice versa. In addition, the subsystem CPUs 100A and 100B can each output a reset signal to itself and the other CPU in order to start the same operation in synchronization with the clock signal.

In this configuration, the single-subsystem state storage circuits 300A and 300B are each connected to its own CPU and the other CPU 100B and 100A and the dual-subsystem state storage circuits 110A and 110B through transmission lines for conveying single-subsystem state signals 320A and 320B, allowing both the CPUs 100A and 100B to read out and write data from and into the single-subsystem state storage circuits 300A and 300B and the dual-subsystem state storage circuits 110A and 110B. The dual-subsystem state storage circuits 110A and 110B are used for storing the state of the two subsystems determined by a combination of the states stored in the single-subsystem state storage circuits 300A and 300B.

The operation comparing circuits 120A and 120B are connected to the dual-subsystem state storage circuits 110A and 110B through transmission lines for conveying operation-concurrence verifying state signals 330A and 330B respectively. When the operation-concurrence verifying state signals 330A and 330B are turned on, the system buses 310A and 310B pertaining to its own subsystem and the other subsystem respectively are compared with each other and a result of the comparison is reported to the CPUs 100A and 100B through transmission lines for conveying operation comparison result signals 390A and 390B respectively.

In addition, the output selecting circuits 340A and 340B are connected to the dual-subsystem state storage circuits 110A and 110B through the transmission lines for conveying the operation-concurrence verifying state signals 330A and 330B respectively. When the operation-concurrence verifying state signals 330A and 330B are turned on, the system bus 310A or 310B of its own subsystem is halted and system bus 310B or 310A of the other subsystem is selected to pass on signals output by the CPU 100B or 100A to the I/O bus 370B or 370A respectively.

FIG. 5 is a diagram showing a typical definition of bit patterns stored in the single-subsystem state storage circuit 300 (strictly speaking, the single-subsystem state storage circuits 300A and 300B). The single-subsystem state storage circuit 300 includes a four-bit register for storing a bit pattern defining the operating state of the single-subsystem CPU 100 (strictly speaking, the CPU 100A or 100B). The operating state of the single-subsystem CPU 100 can be a state of operating in the system, a state of being cut off from the system or a state of operation-concurrence verification. As shown in the figure, the state of operating in the system, the state of being cut off from the system and the state of operation-concurrence verification are indicated by bit patterns 0001, 0010 and 0100 respectively. The other patterns are not used.

FIG. 6 is a diagram showing a typical definition of bit patterns stored in the dual-subsystem state storage circuit 110 (strictly speaking, the dual-subsystem state storage circuits 110A and 110B). The dual-subsystem system state storage circuit 110 includes a two-bit register for storing a bit pattern defining the operating state of the two subsystems. The operating state of the two subsystems can be a state with both the subsystems carrying out the same operation, a state with both the subsystems carrying out different operations, a state of verifying concurrence of operations for the A subsystem or a state of verifying concurrence of operations for the B subsystem. As shown in the figure, the state with both the subsystems carrying out the same operation, the state with both the subsystems carrying out different operations the state of verifying concurrence of operations for the A subsystem and the state of verifying concurrence of operations for the B subsystem are represented by the bit patterns 11, 00, 01 and 10 respectively.

FIG. 7 is a diagram showing relations between the operating state of the two subsystems, which is determined by the combination of the operating states of the CPUs 100A and 100B in the individual subsystems, and the operating states of the output selecting circuits 340A and 340B and the operation comparing circuits 120A and 120B. As shown in the figure, when the CPUs 100A and 100B are both in a state of being cut off from the system, the two subsystems are in a state of carrying out different operations. In this state, the output selecting circuit 340A selects the system bus 310A of its own subsystem in order to pass on signals output by the CPU 100A to the I/O bus 370A whereas the output selecting circuit 340B selects the system bus 310B of its own subsystem in order to pass on signals output by the CPU 100B to the I/O bus 370B. The operation comparing circuits 120A and 120B are both in an NOP (No Operation) state, carrying out no operations.

When the CPU 100A is in a state of being cut off from the system while the CPU 100B is in a state of operating in the system, the two subsystems are in a state of carrying out different operations. In this state, the output selecting circuit 340A selects the system bus 310A of its own subsystem in order to pass on signals output by the CPU 100A to the I/O bus 370A whereas the output selecting circuit 340B selects the system bus 310B of its own subsystem in order to pass on signals output by the CPU 100B to the I/O bus 370B. The operation comparing circuits 120A and 120B are both in an NOP state, carrying out no operations.

When the CPU 100A is in a state of operation-concurrence verification while the CPU 100B is in a state of operating in the system, the two subsystems are in a state of verifying concurrence of operations for the A subsystem. In this state, the output selecting circuits 340A and 340B both select the system bus 310B and the operation comparing circuit 120B is in an NOP state. On the other hand, the operation comparing circuit 120A compares signals output by the CPU 100A of its own subsystem with the corresponding signals output by the CPU 100B of the other subsystem in order to verify the operation carried out by the CPU 100A. At that time, the operation comparing circuit 120A monitors not only data on the system buses 310A and 310B, but also control signals in each clock cycle, allowing, of course, data discordance in addition to control signals out off synchronization to be detected. As a result, the concurrence of operations can be verified with an even higher degree of reliability.

When the CPU 100A is in a state of operating in the system while the CPU 100B is in a state of being cut off from the system, the two subsystems are in a state of carrying out different operations. In this state, the output selecting circuit 340A selects the system bus 310A of its own subsystem in order to pass on signals output by the CPU 100A to the I/O bus 370A whereas the output selecting circuit 340B selects the system bus 310B of its own subsystem in order to pass on signals output by the CPU 100B to the I/O bus 370B. The operation comparing circuits 120A and 120B are both in an NOP state, carrying out no operations.

When the CPU 100A is in a state of operating in the system while the CPU 100B is in a state of operation-concurrence verification, the two subsystems are in a state of verifying concurrence of operations for the B subsystem. In this state, the output selecting circuits 340A and 340B both select the system bus 310A and the operation comparing circuit 120A is in an NOP state. On the other hand, the operation comparing circuit 120B compares signals output by the CPU 100B of its own subsystem with the corresponding signals output by the CPU 100A of the other subsystem in order to verify the operation carried out by the CPU 100B. At that time, the operation comparing circuit 120B monitors not only data on the system buses 310A and 310B, but also control signals in each clock cycle, allowing, of course, data discordance in addition to control signals out off synchronization to be detected. As a result, the concurrence of operations can be verified with an even higher degree of reliability.

When the CPUs 100A and 100B are both in a state of operating in the system, the two subsystems are in a state of carrying out the same operation. In this state, the output selecting circuit 340A selects the system bus 310A of its own subsystem in order to pass on signals output by the CPU 100A to the I/O bus 370A whereas the output selecting circuit 340B selects the system bus 310B of its own subsystem in order to pass on signals output by the CPU 100B to the I/O bus 370B. The operation comparing circuits 120A and 120B are both in an NOP state, carrying out no operations.

FIG. 8 is a diagram showing examples of actual circuit configurations of the CPU 100 (strictly speaking, the CPUs 100A and 100B), the dual-subsystem state storage circuit 110 (strictly speaking, the dual-subsystem state storage circuits 110A and 110B), the single-subsystem state storage circuit 300 (strictly speaking, the single-subsystem state storage circuits 300A and 300B), the operation comparing circuit 120 (strictly speaking, the operation comparing circuits 120A and 120B) and the output selecting circuit 340 (strictly speaking, the output selecting circuits 340A and 340B) composing the dual-CPU computer system shown in FIG. 4. As shown in FIG. 8, the dual-subsystem state storage circuit 110 includes a two-bit registers 81 and a decoder 410 (Strictly speaking, the dual-subsystem state storage circuit 110A includes a two-bit register 81A and a decoder 410A whereas the dual-subsystem state storage circuit 110B includes a two-bit register 81B and a decoder 410B). The decoder 410 decodes a bit pattern stored in the two-bit registers 81, outputting the result of the decoding to the output-selecting circuit 340 and the operation comparing circuit 120 as the operation-concurrence verifying state signal 330.

The single-subsystem state storage circuit 300 includes a four-bit registers 82 and a decoder 400 (Strictly speaking, the single-subsystem state storage circuit 300A includes a four-bit register 82A and a decoder 400A whereas the single-subsystem state storage circuit 300B includes a four-bit register 82B and a decoder 400B). The decoder 400 decodes a bit pattern stored in the four-bit registers 82, outputting the result of the decoding to the dual-subsystem state storage circuit 110. The operation comparing circuit 120 includes a comparator whereas the output selecting circuit 340 is a combination of logic circuits.

The contents of the four-bit register 82 employed in the single-subsystem state storage circuit 300 can be updated by a program controlling the state of the CPU 100A or 100B from either the CPU 100A or 100B through the single-subsystem state signal 320.

When the operation-concurrence verifying state signal 330A or 330B is turned on, the output selecting circuit 340 halts the system bus 310A or 310B of its own subsystem and selects the system bus 310B or 310A of the other subsystem.

When the operation-concurrence verifying state signal 330 is turned on, the operation comparing circuit 120 compares data and control signals, signals output by the CPUs 100A and 100B, on the system buses 310A and 310B pertaining to its own subsystem and the other subsystem with each other and if the result of the comparison indicates operation discordance, the operation comparing circuit 120 outputs the operation comparison result signal 390, reporting the result of the comparison to the CPU 100B or 100A.

Now, operations of the circuit shown in FIG. 8 are explained. In the explanation, the CPU 100B is assumed to be the CPU in a state of operating in the system or the CPU of the active subsystem while the CPU 100A is assumed to be the CPU in a process of maintenance/replacement or the CPU of the subsystem in a process of maintenance/replacement. Initially, the CPU 100A is not installed yet. In this case, a state of the CPU 100A cut off from the system is stored in the single-subsystem state storage circuit 300A while a state of the CPU 100B operating in the system is stored in the single-subsystem state storage circuit 300B. As for the dual-subsystem state storage circuits 110A and 110B, the bit pattern 00 is set in both the two-bit registers 81A and 81B.

Then, the replacement CPU 100A is installed, departing from the states described above. Knowing that the CPU 100A has been installed from the interface signal 380A, the CPU 100B writes the bit pattern 0010 into the four-bit register 82A employed in the single-subsystem state storage circuit 300A and then sends a reset signal to its own subsystem and the other subsystem through the interface signal 380B in order to put both the subsystems in a state of carrying out the same operation. After the reset signal is turned off, the CPUs 100A and 100B enter a state with both the subsystems carrying out the same operation wherein the same program is executed thereby in synchronization with a clock signal.

Later on, the CPU 100B changes the contents of the four-bit register 82A employed in the single-subsystem system state storage circuit 300A from the bit pattern 0010 to 0100. The decoders 400A and 400B decodes the new contents of the four-bit register 82A, loading the bit pattern 01 to the two-bit registers 81A and 81B employed in the dual-subsystem system state storage circuits 110A and 110B respectively. As described earlier, the bit pattern 0100 in the four-bit register 82A employed in the single-subsystem system state storage circuit 300A indicates that the CPU 100A is in a state of operation-concurrence verification whereas the bit pattern 01 in the two-bit registers 81A and 81B employed in the dual-subsystem system state storage circuits 110A and 110B indicate that the two systems are in a state of verifying operation concurrence for the A subsystem. The decoders 410A and 410B decode the contents of the two-bit registers 81A and 81B employed in the dual-subsystem system state storage circuits 110A and 110B, turning on the operation-concurrence verifying state signal 330A. When the operation-concurrence verifying state signal 330A is turned on, the operation comparing circuit 120A for the CPU 100A works, comparing signals output by the CPU 100A of the subsystem in the process of maintenance/replacement with the corresponding signals output by the CPU 100B of the active subsystem. In addition, since the operation-concurrence verifying state signal 330A is turned on, the output selecting circuit 340A halts the system bus 310A of its own subsystem, selecting the system bus 310B in order to pass on signals output by the CPU 100B to the I/O bus 370B.

If results of the comparison of operations carried out at every clock cycle indicate that any data or control signals output by the replacement CPU 100A does not match or are not synchronous with the corresponding data or control signals output by the CPU 100B, the operation comparison result signal 390A is turned on to notify the CPU 100B of the operation discordance. A program which detects the fact that the operation comparison result signal 390A is turned on sets the bit pattern 0010 in the four-bit register 82A employed in the single-subsystem state storage circuit 300A through the single-subsystem state signal 320A to indicate that the CPU 100A is in a state of being cut off from the system. The decoders 400A and 400B decode the new contents of the four-bit register 82A, loading the bit pattern 00 to the two-bit registers 81A and 81B employed in the dual-subsystem system state storage circuits 110A and 110B respectively. As described earlier, the bit pattern 00 in the two-bit registers 81A and 81B employed in the dual-subsystem system state storage circuits 110A and 110B are used to indicate that the two systems are in a state of carrying out different operations. In addition, the decoder 410A decodes the contents of the two-bit register 81A employed in the dual-subsystem system state storage circuit 110A, turning off the operation-concurrence verifying state signal 330A. When the operation-concurrence verifying state signal 330A is turned off, the operations of the output comparing circuit 120A for the subsystem in the process of maintenance/replacement are halted and output selecting circuit 340A passes on signals output by the CPU 100A of its own subsystem from the system bus 310A to the I/O bus 370A.

If results of the comparison of operations carried out at every clock cycle indicate that all data and control signals output by the replacement CPU 100A match and are synchronous with the corresponding data and control signals output by the CPU 100B, on the other hand, the operation comparison result signal 390A remains turned off as it is. The program in the CPU 100B which detects the fact that the operation comparison result signal 390A remains turned off sets the bit pattern 0001 in the four-bit register 82A employed in the single-subsystem state storage circuit 300A through the single-subsystem state signal 320A to indicate that the CPU 100A is in a state of operating in the system. The decoders 400A and 400B decode the new contents of the four-bit register 82A, loading the bit pattern 11 to the two-bit registers 81A and 81B employed in the dual-subsystem system state storage circuits 110A and 110B respectively. As described earlier, the bit pattern 11 in the two-bit registers 81A and 81B employed in the dual-subsystem system state storage circuits 110A and 110B are used to indicate that the two systems are in a state of carrying out the same operations. In addition, the decoder 410A decodes the contents of the two-bit registers 81A employed in the dual-subsystem system state storage circuit 110A, turning off the operation-concurrence verifying state signal 330A. When the operation-concurrence verifying state signal 330A is turned off, the operations of the output comparing circuit 120A for the subsystem in the process of maintenance/replacement are halted and output selecting circuit 340A passes on signals output by the CPU 100A of its own subsystem from the system bus 310A to the I/O bus 370A.

As described above, by configuring the dual-subsystem state storage circuit 110, the operation comparing circuit 120, the single-subsystem state storage circuit 300 and the output selecting circuit 340 as shown in FIG. 8 and by letting the programs update the four-bit registers 82A and 82B, the states of the CPUs 100A and 100B can be controlled.

Figure 9:
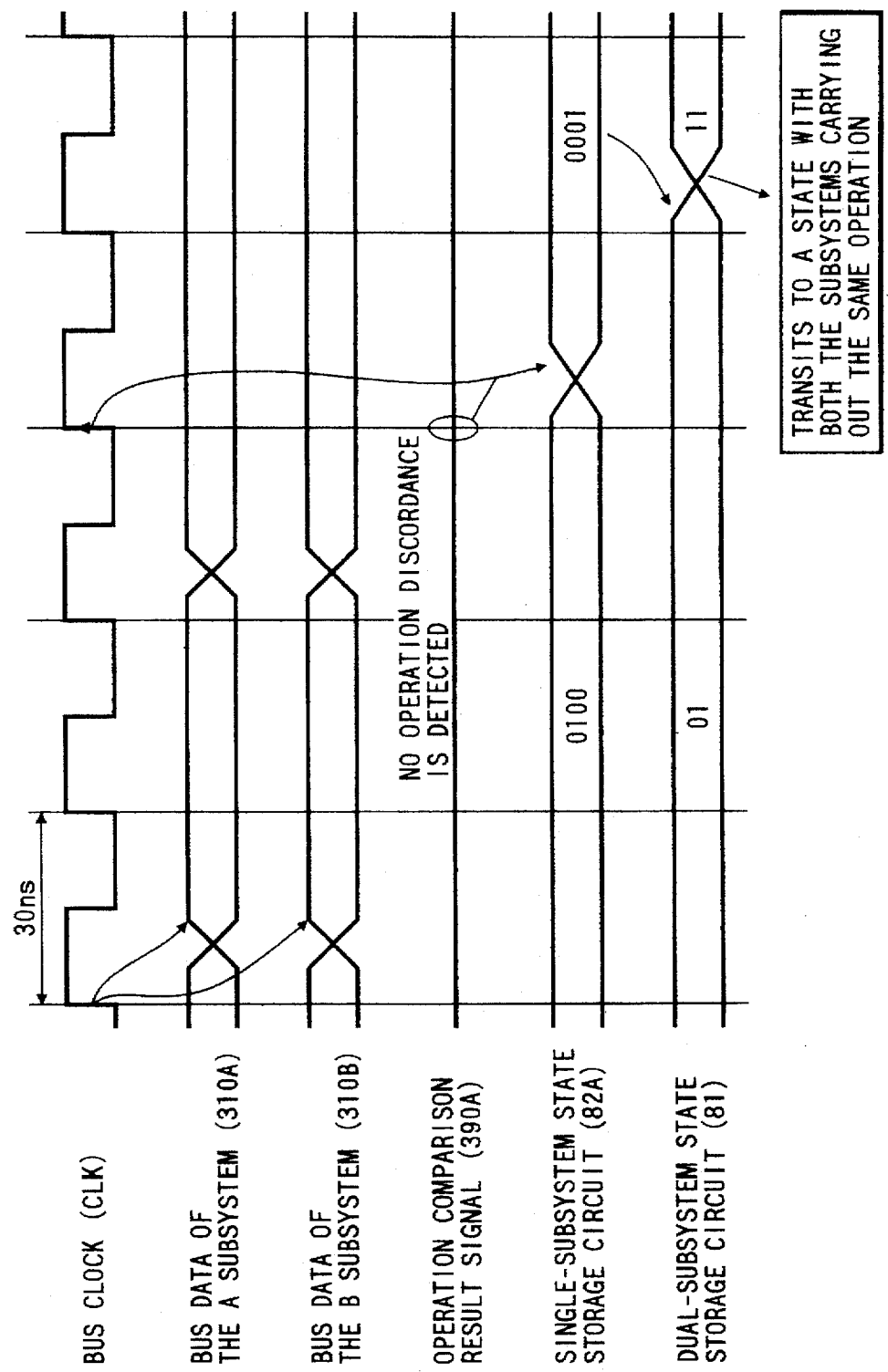
FIG. 9 is timecharts of detection of operation concurrence carried out in the circuit shown in FIG. 8.

FIG. 9 is timecharts showing operations wherein: the CPU 100B serves as the CPU in the operating subsystem whereas the CPU 100A serves as the CPU in the subsystem in a process of maintenance/replacement; the operation comparing circuit 120A compares data and control signals on the system bus 310A (that is, signals output by the CPU 100A) with the corresponding data and control signals on the system bus 310B (that is, signals output by the CPU 100B); no discordance is detected in the comparison; the CPU 100A transits to a state of operating in the system; and later on, the two subsystems enter a state of carrying out the same operation.

As shown in the figure, the bus clock cycle is 30 ns in length. If pieces of data output by the CPUs 100A and 100B to the system buses 310A and 310B respectively do not mismatch each other during the valid period of the data between rising edges of a bus clock signal CLK, the operation comparison result signal 390A remains turned off as it is. Then, the program executed by the CPU 100B detects the fact that the operation comparison result signal 390A remains turned off on a rising edge of the bus clock signal CLK immediately following the valid period of the data, changing the contents of the four-bit register 82A employed in the single-subsystem state storage circuit 300A from the bit pattern 0100 to 0001.

The change in contents of the four-bit register 82A causes the contents of the two-bit registers 81A and 81B employed in the dual-subsystem state storage circuits 110A and 110B respectively to be updated from the bit pattern 01 to 11 to indicate that the system has entered a state with both the two subsystems carrying out the same operation. It should be noted that, in the operations shown in FIG. 9, the bit pattern 01 in the two-bit register 81 employed in the dual-subsystem state storage circuit 110 indicates that the CPU 100A is in a state of operation-concurrence verification which has a sufficiently long period of several seconds.

FIG. 10 is timecharts showing operations wherein: the CPU 100B serves as the CPU in the operating subsystem whereas the CPU 100A serves as the CPU in the subsystem in a process of maintenance/replacement; the operation comparing circuit 120A compares data and control signals on the system bus 310A (that is, signals output by the CPU 100A) with the corresponding data and control signals on the system bus 310B (that is, signals output by the CPU 100B); operation discordance is detected in the comparison; the CPU 100A transits to a state of being cut off from the system; and later on, the two subsystems enter a state of carrying out different operations.

As shown in the figure, the bus clock cycle is 30 ns in length. On a rising edge of the bus clock signal CLK, the CPUs 100A and 100B should output the same data to the system buses 310A and 310B respectively. In the event of operation discordance, however, signals output by the CPU 100A in a state of operation-concurrence verification, that is, data on the system bus 310A, get off from synchronization with signals output by the CPU 100B in a state of operating in the system, that is, data on the system bus 310B, causing the operation comparison result signal 390A to turn on. Then, the program executed by the CPU 100B detects the fact that the operation comparison result signal 390A is turned on, changing the contents of the four-bit register 82A employed in the single-subsystem state storage circuit 300A to the bit pattern 0010 to indicate that the CPU 100A is cut off from the system on the immediately following rising edge of the bus clock signal CLK.

The change in contents of the four-bit register 82A causes the contents of the two-bit registers 81A and 81B employed in the dual-subsystem state storage circuits 110A and 110B respectively to be updated from the bit pattern 01 to 00 to indicate that the system is in a state with the two subsystems carrying out different operations on the subsequent rising edge of the bus clock signal CLK. It should be noted that, also in the operations shown in FIG. 10, the bit pattern 01 in the two-bit register 81 employed in the dual-subsystem state storage circuit 110 indicates that the CPU 100A is in a state of operation-concurrence verification which has a sufficiently long period of several seconds.

As described above, according to the present invention, in the maintenance/replacement of one of two CPUs employed in a dual-CPU computer system, the concurrence of operations carried out by the active CPU (that is, the CPU of the active subsystem) and the replacement CPU (that is, the CPU of the subsystem in a process of maintenance/replacement) is verified. If the operation carried out by the replacement CPU does not match that of the active CPU, the replacement CPU is determined to be faulty and is cut off, being put in a state prior to the state with the two subsystems carrying out the same operation. In this way, a failure that would occur during a dual-subsystem synchronous operation carried out thereafter by the computer system due to the fault of the replacement CPU installed by mistake can be prevented from entailing a system down on both the subsystems.

As described above, the present invention has an effect in that, when a CPU having an initial fault is installed by mistake in a dual-CPU computer system in an on-line maintenance/replacement process of the system, a failure that would occur during a dual-subsystem synchronous operation carried out thereafter by the dual-CPU computer system due to the fault of the replacement CPU can be prevented from entailing a system down on both the subsystems.

What is claimed is:

1. A method of verifying concurrence of operations in maintenance/replacement of twin CPUs each employed in one of two subsystems of a dual-CPU computer system allowing one of said CPUs in one of said subsystems to undergo maintenance/replacement process while the other CPU in the other subsystem is operating, which system comprises:

dual-subsystem state storage means for storing at least a state with said two subsystems carrying out the same operation, a state with said two subsystems carrying out different operations or a state of verifying concurrence of operations carried out by said two subsystems as an operating state of said twin CPUs; and operation comparing means connected to said dual-subsystem state storage means and said twin CPUs for comparing operations carried out by said twin CPUs with each other in said state of verifying concurrence of operations carried out by said two subsystems, wherein:

said two subsystems are let start to carry out identical operations after a replacement CPU is installed in a maintenance/replacement process; then said operating state of said twin CPUs stored in said dual-subsystem state storage means is changed from said state with said two subsystems carrying out different operations to said state of verifying concurrence of operations carried out by said two subsystems; and then said operation comparing means are let start to compare said identical operations carried out by said twin CPUs with each other for a predetermined time period; and if a result of comparison output by said operation comparing means indicates operation concurrence, said state with said two subsystems carrying out the same operation is stored in said dual-subsystem state storage means as an operating state of said two subsystems; or else if said result of comparison output by said operation comparing means indicates operation discordance, on the other hand, said state with said two subsystems carrying out different operations is stored in said dual-subsystem state storage means as an operating state of said two subsystems;

wherein an output selecting unit is provided in each of said subsystem;

said output selecting unit is connected to said dual-subsystem state storage means; and said output selecting unit receives signals output by said twin CPUs;

said output selecting unit selects said signals output by said CPU of said subsystem associated with said output selecting unit if said operating state of said twin CPUs stored in said dual-subsystem state storage means is said state with said two subsystems carrying out the same operation or said state with said two subsystems carrying out different operations but said output selecting unit selects said signals output by said CPU of said subsystem not associated with said output selecting unit if said operating state of said twin CPUs stored in said dual-subsystem state storage means is said state of verifying concurrence of operations carried out by said two subsystems.

2. A method of verifying concurrence of operations in maintenance/replacement of twin CPUs according to claim 1 wherein:

a single-system state storage unit is provided for storing a single-subsystem operating state of one of said subsystems and another single-system state storage unit is provided for storing a single-subsystem operating state of the other subsystem; and a dual-subsystem operating state of said subsystems stored in said dual-subsystem state storage means is determined in accordance with said single-subsystem operating states stored in said single-subsystem state storage units.

3. A method of verifying concurrence of operations in maintenance/replacement of twin CPUs according to claim 2 wherein:

each of said single-subsystem state storage units is used for storing at least a state of operating in said system, a state of being cut off from said system or a state of operation-concurrence verification as said single-subsystem operating state; and a state with said two subsystems carrying out the same operation is stored in said dual-subsystem state storage means as said dual-subsystem operating state if said state of operating in said system is stored in each of said single-subsystem state storage units as said single-subsystem operating state;

a state of verifying concurrence of operations for one of said subsystems is stored in said dual-subsystem state storage means as said dual-subsystem operating state if said state of operation-concurrence verification is stored in one of said single-subsystem state storage units as said single-subsystem operating state while said state of operating in said system is stored in the other single-subsystem state storage unit as said single-subsystem operating state; and a state with said subsystems carrying out different operations is stored in said dual-subsystem state storage means as said dual-subsystem operating state for any other combinations of said single-subsystem operating states stored in said single-subsystem state storage units.

4. A method of verifying concurrence of operations in maintenance/replacement of twin CPUs according to claim 3 wherein:

with said state of operating in said system stored in said single-subsystem state storage unit of one of said subsystems and said CPU of the other subsystem put in a maintenance/replacement process, said single-subsystem operating state stored in said single-subsystem state storage unit of said other subsystem put in said maintenance/replacement process is changed from said state of being cut off from said system to said state of operation-concurrence verification; and if said result of comparison output by said operation comparing means indicates operation discordance, said single-subsystem operating state stored in said single-subsystem state storage unit of said other subsystem put in said maintenance/replacement process is changed from said state of operation-concurrence verification back to said state of being cut off from said system and said CPU of said other subsystem put in a maintenance/replacement process is cut off from said system.

5. A method of verifying concurrence of operations in maintenance/replacement of twin CPUs according to claim 1 wherein said operation comparing means compare predetermined signals of said twin CPUs in every clock cycle of said computer system.

6. A method of verifying concurrence of operations in maintenance/replacement of twin CPUs each employed in one of two subsystems of a dual-CPU computer system allowing one of said CPUs in one of said subsystems to undergo maintenance/replacement process while the other CPU in the other subsystem is operating, which system comprises:

a dual-subsystem state storage unit for storing at least a state with said two subsystems carrying out the same operation, a state with said two subsystems carrying out different operations or a state of verifying concurrence of operations carried out by said two subsystems as an operating state of said twin CPUs; and operation comparing unit connected to said dual-subsystem state storage unit and said twin CPUs for comparing operations carried out by said twin CPUs with each other in said state of verifying concurrence of operations carried out by said two subsystems, wherein:

said two subsystems are let start to carry out identical operations after a replacement CPU is installed in a maintenance/replacement process; then said operating state of said twin CPUs stored in said dual-subsystem state storage unit is changed from said state with said two subsystems carrying out different operations to said state of verifying concurrence of operations carried out by said two subsystems; and then said operation comparing unit is let start to compare said identical operations carried out by said twin CPUs with each other for a predetermined time period; and if a result of comparison output by said operation comparing unit indicates operation concurrence, said state with said two subsystems carrying out the same operation is stored in said dual-subsystem state storage means as an operating state of said two subsystems and said maintenance/replacement process is completed; or else if said result of comparison output by said operation comparing unit indicates operation discordance, on the other hand, said state with said two subsystems carrying out different operations is stored in said dual-subsystem state storage means as an operating state of said two subsystems and said replacement CPU is cut off from said system;

wherein an output selecting unit is provided in each of said subsystem;

said output selecting unit is connected to said dual-subsystem state storage unit; and said output selecting unit receives signals output by said twin CPUs;

said output selecting unit selects said signals output by said CPU of said subsystem associated with said output selecting unit if said operating state of said twin CPUs stored in said dual-subsystem state storage unit is said state with said two subsystems carrying out the same operation or said state with said two subsystems carrying out different operations but said output selecting unit selects said signals output by said CPU of said subsystem not associated with said output selecting unit if said operating state of said twin CPUs stored in said dual-subsystem state storage unit is said state of verifying concurrence of operations carried out by said two subsystems.

7. A maintainable/replaceable computer system comprising:

at least twin CPUs each employed in one of two subsystems of said computer system;

a single-system state storage unit for storing a single-subsystem operating state of one of said subsystems and another single-system state storage unit for storing a single-subsystem operating state of the other subsystem;

a dual-subsystem state storage unit for storing at least a state with said two subsystems carrying out the same operation, a state with said two subsystems carrying out different operations or a state of verifying concurrence of operations carried out by said two subsystems as an operating state of said twin CPUs;

operation comparing unit connected to said dual-subsystem state storage unit and said twin CPUs for comparing operations carried out by said twin CPUs with each other in said state of verifying concurrence of operations carried out by said two subsystems; and a control unit whereby:

said two subsystems are let start to carry out identical operations after a replacement CPU is installed in a maintenance/replacement process; then said operating state of said twin CPUs stored in said dual-subsystem state storage unit is changed from said state with said two subsystems carrying out different operations to said state of verifying concurrence of operations carried out by said two subsystem; and then said operation comparing unit are let start to compare said identical operations carried out by said twin CPUs with each other for a predetermined time period; and if a result of comparison output by said operation comparing unit indicates operation concurrence, said state with said two subsystems carrying out the same operation is stored in said dual-subsystem state storage means as an operating state of said two subsystem; or else if said result of comparison output by said operation comparing unit indicates operation discordance, on the other hand, said state with said two subsystems carrying out different operations is stored in said dual-subsystem state storage means an operating state of said two subsystems;

wherein an output selecting unit is provided in each of said subsystems;

said output selecting unit is connected to said dual-subsystem state storage unit; and said output selecting unit receives signals output by said twin CPUs;

said output selecting unit selects said signals output by said CPU of said subsystem associated with said output selecting unit if said operating state of said twin CPUs stored in said dual-subsystem state storage unit is said state with said two subsystems carrying out the same operation or said state with said two subsystems carrying out different operations but said output selecting unit selects said signals output by said CPU of said subsystem not associated with said output selecting unit if said operating state of said twin CPUs stored in said dual-subsystem state storage unit is said state of verifying concurrence of operations carried out by said two subsystems.

8. A maintainable/replaceable computer system comprising:

at least twin CPUs each employed in one of two subsystem of said computer system;

a single-system state storage unit for storing a single-subsystem operating state of one of said subsystems and another single-system state storage unit for storing a single-subsystem operating state of the other subsystem;

a dual-subsystem state storage unit for storing at least a state with said two subsystems carrying out the same operation, a state with said two subsystems carrying out different operations or a state of verifying concurrence of operations carried out by said two subsystems as an operating state of said twin CPUs;

operation comparing unit connected to said dual-subsystem state storage unit and said twin CPUs for comparing operations carried out by said twin CPUs with each other in said state of verifying concurrence of operations carried out by said two subsystem; and a control unit whereby;

said two subsystems are let start to carry out identical operations after a replacement CPU is installed in a maintenance/replacement process; then said operating state of said twin CPUs stored in said dual-subsystem state storage unit is changed from said state with said two subsystems carrying out different operations to said state of verifying concurrence of operations carried out by said two subsystems; and then said operation comparing unit are let start to compare said identical operations carried out by said twin CPUs with each other for a predetermined time period; and if a result of comparison output by said operation comparing unit indicates operation concurrence, said state with said two subsystems carrying out the same operation is stored in said dual-subsystem state storage means as an operating state of said two subsystems and said maintenance/replacement process is completed; or else if said result of comparison output by said operation comparing unit indicates operation discordance, on the other hand, said state with said two subsystems carrying out different operations is stored in said dual-subsystem state storage means as an operating state of said two subsystems and said replacement CPU is cut off from said system;

wherein an output selecting unit is provided in each of said subsystems;

said output selecting unit is connected to said dual-subsystem state storage unit; and said output selecting unit receives signals output by said twin CPUs;

said output selecting unit selects said signals output by said CPU of said subsystem associated with said output selecting unit if said operating state of said twin CPUs stored in said dual-subsystem state storage unit is said state with two said subsystems carrying out the same operation or said state with said two subsystems carrying out different operations but said output selecting unit selects said signals output by said CPU of said subsystem not associated with said output selecting unit if said operating state of said twin CPUs stored in said dual-subsystem state storage unit is said state of verifying concurrence of operations carried out by said two subsystems.

9. A method of verifying concurrence of operations carried out by a maintainable/replaceable computer system comprising at least twin CPUs each employed in one of two subsystems of said computer system, said method comprising the steps of:

storing at least a state with said two subsystems carrying out the same operation, a state with said two subsystems carrying out different operations or a state of verifying concurrence of operations carried out by said two subsystems as an operating state of said twin CPUs in a dual-subsystem state storage unit;

installing a replacement CPU;

letting said two subsystems start to carry out identical operations;

changing said operating state of said two CPUs stored in said dual-subsystem state storage unit from said state with said two subsystems carrying out different operations to said state of verifying concurrence of operations carried out by said two subsystems;

starting to compare said identical operations carried out by said twin CPUs with each other; and storing said state with said two subsystems carrying out the same operation in said dual-subsystem state storage unit as an operating state of said two subsystems if a result of comparison indicates operation concurrence, or else storing said state with said two subsystems carrying out different operations in said dual-subsystem state storage unit as an operating state of said two subsystems if said result of comparison indications operation discordance;

wherein an output selecting unit is provided in each of said subsystems;

said output selecting unit is connected to said dual-subsystem state storage unit; and said output selecting unit receives signals output by said twin CPUs;

said output selecting unit selects said signals output by said CPU of said subsystem associated with the said output selecting unit if said operating state of said twin CPUs stored in said dual-subsystem state storage unit is said state with said two subsystems carrying out the same operation or said state with said two subsystems carrying out different operations but said output selecting unit selects said signals output by said CPU of said subsystem not associated with said output selecting unit if said operating state of said twin CPUs stored in said dual-subsystem state storage unit is said state of verifying concurrence of operations carried out by said two subsystems.

* * * * *